(12) United States Patent
Gui

(10) Patent No.: US 11,698,284 B2
(45) Date of Patent: Jul. 11, 2023

(54) ULTRA-LOW MODULE STRESS PROTECTED LOAD CELL

(71) Applicant: ANYLOAD YOUNGZON TRANSDUCER (HANGZHOU) CO., LTD., Zhejiang (CN)

(72) Inventor: Yong Gui, Zhejiang (CN)

(73) Assignee: ANYLOAD YOUNGZON TRANSDUCER (HANGZHOU) CO., LTD., Zhejiang (CN)

( * ) Notice: Subject to any disclaimer, the term of this patent is extended or adjusted under 35 U.S.C. 154(b) by 733 days.

(21) Appl. No.: 16/500,043

(22) PCT Filed: May 31, 2018

(86) PCT No.: PCT/CN2018/089157
§ 371 (c)(1),
(2) Date: Oct. 1, 2019

(87) PCT Pub. No.: WO2019/029239
PCT Pub. Date: Feb. 14, 2019

(65) Prior Publication Data
US 2020/0033182 A1 Jan. 30, 2020

(30) Foreign Application Priority Data
Aug. 7, 2017 (CN) .......................... 201720976132.7

(51) Int. Cl.
G01G 3/14 (2006.01)
G01G 5/00 (2006.01)
G01G 21/23 (2006.01)

(52) U.S. Cl.
CPC ............. G01G 3/141 (2013.01); G01G 5/003 (2013.01); G01G 21/23 (2013.01)

(58) Field of Classification Search
CPC ......... G01G 3/141; G01G 5/003; G01G 23/25
(Continued)

(56) References Cited

U.S. PATENT DOCUMENTS

| 4,864,288 A * | 9/1989 | Cross ..................... G01H 11/02 340/429 |
| 2003/0042050 A1* | 3/2003 | Stimpson ............... G01G 3/141 177/211 |

(Continued)

FOREIGN PATENT DOCUMENTS

| CN | 2924503 Y | 7/2007 |
| CN | 2924503 Y * | 7/2007 |

(Continued)

OTHER PUBLICATIONS

Translation CN-205580576 (Year: 2016).*
(Continued)

*Primary Examiner* — Alexander A Mercado
*Assistant Examiner* — Monica S Young
(74) *Attorney, Agent, or Firm* — Muncy, Geissler, Olds & Lowe, P.C.

(57) ABSTRACT

Provided by the present invention is an ultra-low module load cell, comprising: an elastomer and a bottom plate; the elastomer is disposed above the bottom plate, and a support cushion block is disposed between the elastomer and the bottom plate; the elastomer is provided with a central hole having an opening facing downward; the support cushion block has a central top end, the central top end and the bottom of the central hole being in point contact support or small-area contact support; a gap exists between a hole wall of the center hole and the support cushion block, while the support cushion block is mounted on the bottom plate, and a head portion of the support cushion block is encapsulated in the central hole. The ultra-low load cell module of the present invention is easy to install, accurate in weighing, and may minimize height.

6 Claims, 2 Drawing Sheets

(58) Field of Classification Search
USPC .......................................................... 177/211
See application file for complete search history.

(56) References Cited

U.S. PATENT DOCUMENTS

| | | | | |
|---|---|---|---|---|
| 2009/0230278 A1* | 9/2009 | Tranquilli | ............... | G08B 17/00 |
| | | | | 248/316.1 |
| 2020/0240831 A1* | 7/2020 | Eilersen | ................. | G01G 21/23 |

FOREIGN PATENT DOCUMENTS

| CN | 201359523 | Y | | 12/2009 | | |
|---|---|---|---|---|---|---|
| CN | 201359523 | Y | * | 12/2009 | | |
| CN | 201402190 | Y | * | 2/2010 | | |
| CN | 201402190 | Y | | 2/2010 | | |
| CN | 202066568 | U | * | 12/2011 | | |
| CN | 202329762 | U | | 7/2012 | | |
| CN | 202329762 | U | * | 7/2012 | | |
| CN | 202382824 | U | * | 8/2012 | | |
| CN | 202382824 | U | | 8/2012 | | |
| CN | 205580576 | U | | 9/2016 | | |
| CN | 205580576 | U | * | 9/2016 | | |
| CN | 207964055 | U | * | 10/2018 | | |
| CN | 213451354 | U | * | 6/2021 | | |
| DE | 102013211479 | A1 | * | 12/2014 | ............... | G01K 1/08 |
| DE | 102015012507 | A1 | * | 3/2017 | | |
| EP | 0795741 | A2 | * | 7/1997 | | |
| JP | 2000-346723 | A | | 12/2000 | | |
| JP | 2019087527 | A | * | 6/2019 | ............... | F21S 8/00 |
| WO | WO-2007096992 | A1 | * | 8/2007 | ........... | H04N 5/2254 |

OTHER PUBLICATIONS

Translation CN2924503 (Year: 2007).*
Translation CN213451354 (Year: 2021).*
Translation CN201359523 (Year: 2009).*
Translation EP0795741 (Year: 1997).*
Translation CN207964055 (Year: 2018).*
Translation CN 202066568 (Year: 2011).*

* cited by examiner

ULTRA-LOW MODULE STRESS PROTECTED LOAD CELL

FIELD OF THE INVENTION

The present invention relates to a weighing gauge, in particular to an ultra-low module load cell.

BACKGROUND

At present, most of weigh module sensors used in the tanks and silos, etc. adopt traditional cantilever beam type, double cantilever beam type and S-type load cells, which propose high requirements for the installation height. However, the height should be as low as possible for the indoor environment, to ensure that the height of the building is reduced as much as possible, and in some special occasions, it proposes higher requirements for the installation and accuracy.

A load cell is available in the prior art, as shown in FIG. 1, the load cell comprises an elastomer and a bottom plate, and the elastomer and the bottom plate are connected by bolts disposed in the middle, and an arc gasket is arranged between the elastomer and the bottom plate. Although the load cell has a low height, it is a static design and is greatly affected by the stress state, resulting in low accuracy. In addition, each weighing may change due to change in the stress state and it is difficult to guarantee its repeatability. When slightly titled, the load cell will not achieve accurate weighing.

Another load cell is available, as shown in FIG. 2. The load cell comprises an elastomer, a cushion block and a bottom plate. An O-ring is directly disposed for the cushion block and the elastomer, and the elastomer matches with the bottom plate by bolts. Although the height of the load cell can be reduced to a lower value and its precision is high, it is complicated to install and proposes high requirements for the actual installation conditions. Components that are accurately manufactured in the factory are often difficult to assemble in the site, resulting in difficulty in the implementation of the technical solution, which will produce a great impact on processing and construction. After use for a period of time, the bolts mounted on the elastomer are easily in contact with the bottom plate, causing decreased performance of the load cell.

SUMMARY

The object of the present invention is to overcome the drawback of the prior art and provide an ultra-low module load cell. It is easy to install and accurate in weighing. To achieve the object, the present invention adopts the following technical solutions:

An ultra-low load cell module, comprising: an elastomer and a bottom plate, the elastomer is disposed above the bottom plate, and a support cushion block is disposed between the elastomer and the bottom plate, the elastomer is provided with a central hole having an opening facing downward; wherein, the support cushion block has a central top end, the central top end and the bottom of the central hole being in point contact support or small-area contact support; a gap exists between a hole wall of the center hole and the support cushion block, while the support cushion block is mounted on the bottom plate, and a head portion of the support cushion block is encapsulated in the central hole.

Further, the central hole has a top support connecting section and a lower latching section along its axial direction, the support cushion block is divided into an upper support connecting head portion, a middle portion and a lower mounting and coupling portion along it axial direction; the support connecting head portion is located in the support connecting section, with a gap between them; the latching section is fixed with an anti-pull ring, and the support connecting head portion is encapsulated in the support connecting section by the anti-pull ring, a gap exists between the anti-pull ring and the middle portion of the support cushion block and is tightly padded by a flexible ring or an elastic ring.

Further, the latching section is provided with the anti-pull ring by threaded connection and welding.

Further, the support cushion block is screwed with the bottom plate and then fixed by welding.

Further, a portion of the bottom end below the elastomer is disposed centering on a portion connected to the support cushion block in an overall trend of gradual decrease of height from the inside to the outside, to ensure a movement range of the elastomer with a certain angle.

Further, the central hole is a stepped hole having a larger diameter near the orifice portion; the support connecting head portion of the support cushion block has a larger diameter than the lower part.

Further, the latching section of the central hole is larger than the diameter of the support connecting section, the support connecting head portion of the support cushion block is larger than the diameter of the middle portion of the support cushion block, and the middle portion of the support cushion block is larger than the diameter of the mounting and coupling portion of the support cushion block.

Further, a small-area contact support between the central top end and the bottom of the central hole is formed by contact of two curved surfaces with different curvatures or two spherical surfaces with different radii at the bottom of central hole and the center bottom end.

With the technical solutions adopted, the ultra-low load cell module of the present invention is easy to install, accurate in weighing, and may minimize height.

DETAILED DESCRIPTION

Figure 1:
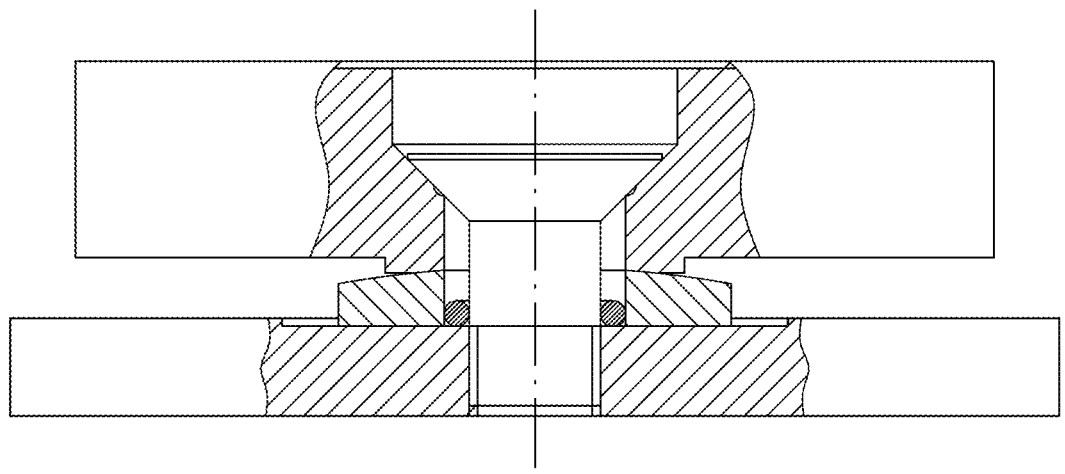
FIG. 1 and FIG. 2 are schematic views of a load cell in the prior art respectively.
Figure 2:
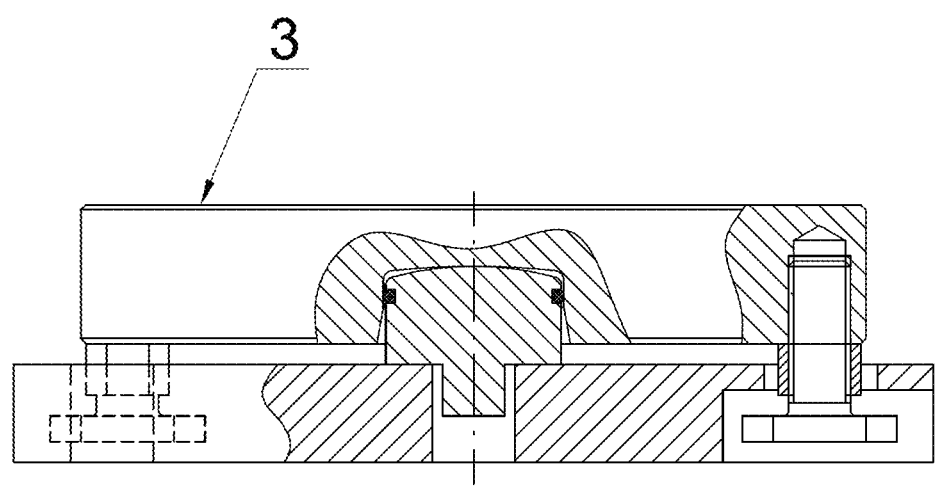
Figure 3:
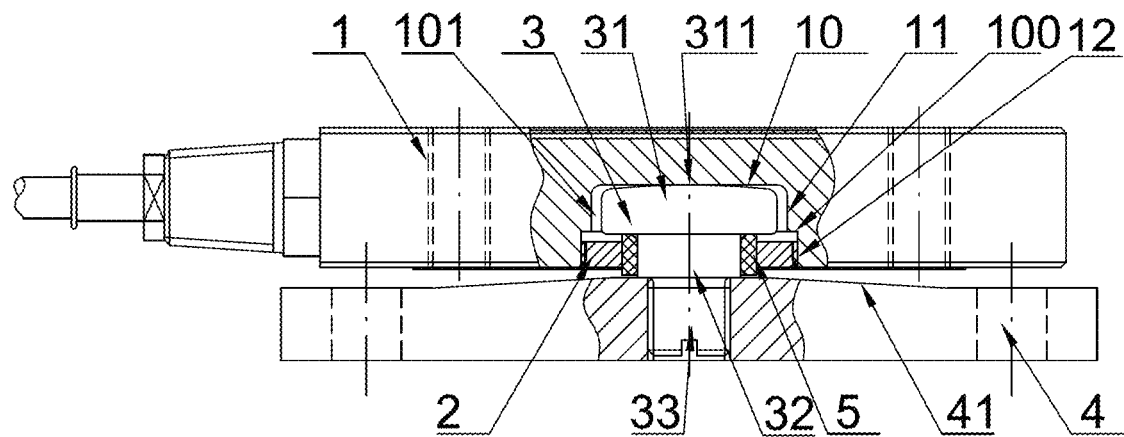
FIG. 3 is a front view of an ultra-low module load cell of the present invention.
Figure 4:
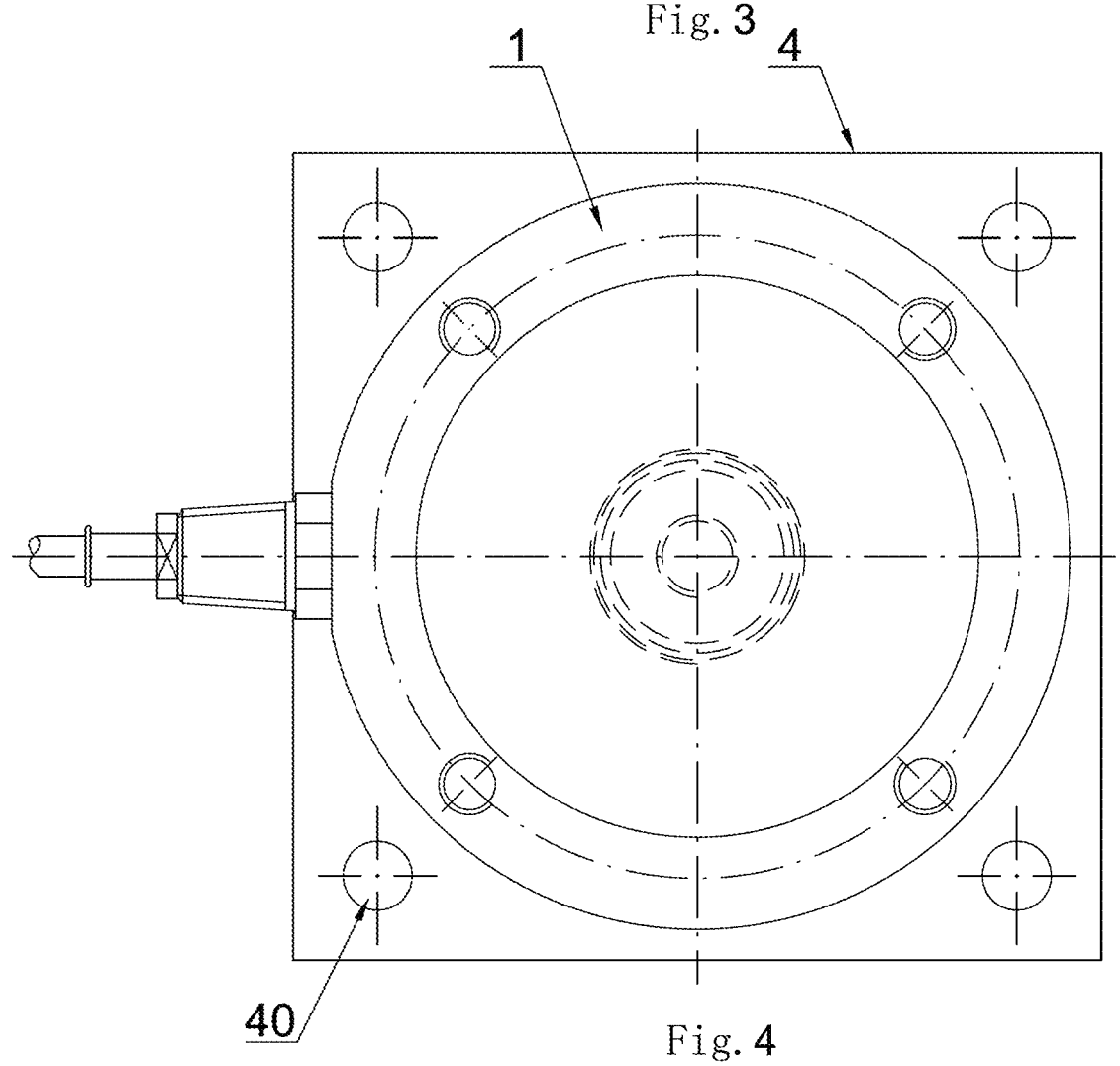
FIG. 4 is a top view of an ultra-low module load cell of the present invention.

The present invention is further described in details in conjunction with drawings and particular embodiments.

The ultra-low module load cell provided herein comprises an elastomer 1, which is in a circular plate shape, the elastomer 1 is disposed above the bottom plate 4, and a support cushion block 3 is disposed between the elastomer 1 and the bottom plate 4, the elastomer 1 is provided with a central hole 100 having an opening facing downward; wherein, the support cushion block has a central top end 311, the central top end 311 and the bottom of the central hole 10 being in point contact support or small-area contact support. A gap 101 exists between a hole wall of the center hole 100 and the support cushion block, so that the elastomer 1 can have a movement with certain angle with respect to the support cushion block 3 if necessary, while the support cushion block 3 is mounted on the bottom plate 4 and cannot be moved, forming a modular structure that allows the elastomer 1 to have swing motion up and down with a certain angle relative to the support cushion block 3 and a 360° rotation centering on the support cushion block, which effectively improves the installation feasibility and effectively guarantee the performance of the load cells when used in the site.

The top of the support cushion block 3 has a substantially centrally symmetrical smooth convex curved surface, and its central top end 311 and the hole bottom 10 form a point contact support or a small-area contact. Preferably, the hole bottom 10 of the central hole 100 has also a centrally symmetrical smooth convex curved surface, except that the curvatures of them are different, and the curved surface of the hole bottom 10 is more flat, or preferably, the smooth convex curved surface is a spherical surface except that the sphere diameter of the bottom of the central hole 10 is greater than that of the central top end 311, such that the above-mentioned point contact or small-area contact is formed, moreover, the support is more stable and the weighing is more accurate.

For easier processing, installation, and better mechanical properties, the central hole 100 is a stepped hole having a larger diameter near the orifice portion; the support connecting head portion of the support cushion block has a larger diameter than the lower part.

The central hole 100 has a top support connecting section 11 and a lower latching section 12 along its axial direction, the support cushion block 3 is divided into an upper support connecting head portion 31, a middle portion 32 and a lower mounting and coupling portion 33 along it axial direction; the support connecting head portion 31 is located in the support connecting section 11, with a gap 101 between them; the latching section 12 is fixed with an anti-pull ring 2, and the support connecting head portion 31 is encapsulated in the support connecting section 11 by the anti-pull ring, a gap exists between the anti-pull ring 2 and the middle portion 32 of the support cushion block and is tightly padded by a flexible ring or an elastic ring 5. The ring 5 can be a silicone rubber ring, which can effectively ensure that the contact position of the support cushion block and the elastomer central hole is stable and prevent sand dust from entering; in addition, the elasticity of the silicone rubber can guarantee that the elastomer has a certain movement space, and the silicone rubber has toughness to make the elastomer 1 to achieve self-reset, to ensure consistent position of the force points and play a buffering role and effectively guarantee the testing accuracy when the load cell is actually installed.

Preferably, the latching section 12 is provided with the anti-pull ring 2 by threaded connection and welding, to prevent the elastomer 1 from being pulled up when an extreme situation occurs, thereby enhancing the safety of use. The support cushion block 3 and the bottom plate 4 are preferably screwed and then loosened by welding. The anti-pull ring 2 is connected with the elastomer 1 by fixation and the support cushion block 3 is connected with the bottom plate 4 by fixation, when the load cell is pulled up, the anti-pull ring 2 effectively prevents the elastomer 1 from being pulled up by the support cushion block 3, so that the support cushion block 3 plays a role of preventing the elastomer 1 from being pulled up, which is particularly important for the safety in natural disasters such as s earthquakes.

In order to facilitate the modular installation, preferably, a portion of the bottom end below the elastomer 1 is disposed centering on a portion connected to the support cushion block in an overall trend of gradual decrease of height from the inside to the outside, for example, the whole or a certain radial segment is set as a slope 41 that gradually decreases from the inside to the outside, to ensure a movement range of the elastomer with a certain angle. In addition, the elastomer and the bottom plate are closer to each other, so that the height of the whole load cell module is minimized and the distribution of design stress is most reasonable. If an extreme laterally external force is applied, the deformation around the cushion block mounting part at the center of the bottom plate is maximized; with this slope, it can effectively ensure that the thickness of the center of the bottom plate is largest. Moreover, such a design can reduce the weight and reduce transportation costs. In addition, the structure, together with the fixation of the support cushion block 3 and the bottom plate 4 and the gap structure at the top of the elastomer 1 and the support cushion block 3 can ensure simple installation on the site without limiting by bolts and bottom plates around the elastomer 1, and avoid the situations that the structures pre-installed in the factory cannot be implemented on the site.

The ultra-low load cell module of the present invention minimizes the height of the load cell while ensuring the accuracy with the cooperation of an elastomer, a bottom plate, an anti-pull ring, a support cushion block and a flexible ring.

The mark 40 is a mounting hole of the bottom plate.

The foregoing-mentioned embodiments are only the preferred embodiments of the present invention, and are intended to be illustrative of the present invention rather than limiting the scope of the invention. Any and all modifications, equivalent replacements and improvements made within the spirit and protection scope of the claims will fall within the scope of protection of the present invention.

What is claimed is:

1. A load cell, comprising:

an elastomer;

a bottom plate; wherein the elastomer is disposed above the bottom plate, and a support cushion block disposed between the elastomer and the bottom plate, wherein the elastomer is provided with a central hole having an opening facing downward, the support cushion block has a support connecting head portion with a central top end, the central top end and a bottom of the central hole are in partial contact, a gap exists between a hole wall of the central hole and the support cushion block, while the support cushion block is mounted on the bottom plate and is connected with the bottom plate by fixation, and the support connecting head portion of the support cushion block is encapsulated in the central hole of the elastomer, the central hole has a support connecting section and a latching section along its axial direction, the support connecting section is an upper section and the latching section is a lower section, the support cushion block comprises the support connecting head portion that is an upper portion, a middle portion and a lower mounting and coupling portion; the support connecting head portion is located in the support connecting section, with the gap between them; the latching section is fixed with an anti-pull ring, the anti-pull ring connects to the elastomer by threading and welding, and the support connecting head portion is encapsulated in the support connecting section by the anti-pull ring, wherein an elastic ring is disposed between the anti-pull ring and the middle portion of the support cushion block.

2. The load cell according to claim 1, wherein the support cushion block is screwed with the bottom plate and then fixed by welding.

3. The load cell according to claim 1, wherein a bottom surface portion of the elastomer is disposed centering on a portion connected to the support cushion block where the support cushion block is centered in the bottom plate that has a top surface having an overall trend of gradual decrease of height from an inside to an outside, to ensure a movement range of the elastomer.

4. The load cell of according to claim 1, wherein the central hole is a stepped hole having a larger diameter at the opening; the support connecting head portion of the support cushion block has a larger diameter than the lower mounting and coupling portion.

5. The load cell according to claim 1, wherein the latching section of the central hole is larger than a diameter of the support connecting section, the support connecting head portion of the support cushion block is larger than a diameter of the middle portion of the support cushion block, and the middle portion of the support cushion block is larger than a diameter of the lower mounting and coupling portion of the support cushion block.

6. The load cell according to claim 1, wherein a small-area contact support between the curved surface of the central top end of the support connecting head portion and the curved surface of the bottom of the central hole is formed by contact of two curved surfaces with different curvatures or two spherical surfaces with different radii.

\* \* \* \* \*